US006897776B1

(12) United States Patent
Haycraft

(10) Patent No.: US 6,897,776 B1
(45) Date of Patent: May 24, 2005

(54) ELECTRONIC COUNTERMEASURE (ECM) SYSTEM AND METHOD

(75) Inventor: Jeffrey Robert Haycraft, Hiawatha, IA (US)

(73) Assignee: Intermec IP Corp., Everett, WA (US)

( * ) Notice: Subject to any disclaimer, the term of this patent is extended or adjusted under 35 U.S.C. 154(b) by 66 days.

(21) Appl. No.: 10/360,562

(22) Filed: Feb. 6, 2003

Related U.S. Application Data

(60) Provisional application No. 60/354,608, filed on Feb. 6, 2002.

(51) Int. Cl.[7] .............................. H04Q 7/00; H04L 9/32
(52) U.S. Cl. .............................. 340/539.24; 340/539.1; 713/201
(58) Field of Search ........................ 340/539.1, 539.24, 340/539.23, 539.26, 5.74, 5.64, 5.8; 713/200, 201, 202

(56) References Cited

U.S. PATENT DOCUMENTS

| | | | | |
|---|---|---|---|---|
| 5,566,339 A | * | 10/1996 | Perholtz et al. | ............. 713/340 |
| 6,281,790 B1 | * | 8/2001 | Kimmel et al. | ............. 340/506 |
| 2003/0061344 A1 | * | 3/2003 | Monroe | ...................... 709/224 |

* cited by examiner

Primary Examiner—Donnie L. Crosland

(57) ABSTRACT

To detect unauthorized attempts to attach to a network having wireless access points, and access point may respond to receipt of a wireless signal from a region that may harbor a network intruder, by sending a special signal to a monitoring station. The special signal may identify the general physical location of the intruder, and the special signal may be transmitted via the network being protected. A source may supply simulated traffic to the access point.

8 Claims, 1 Drawing Sheet

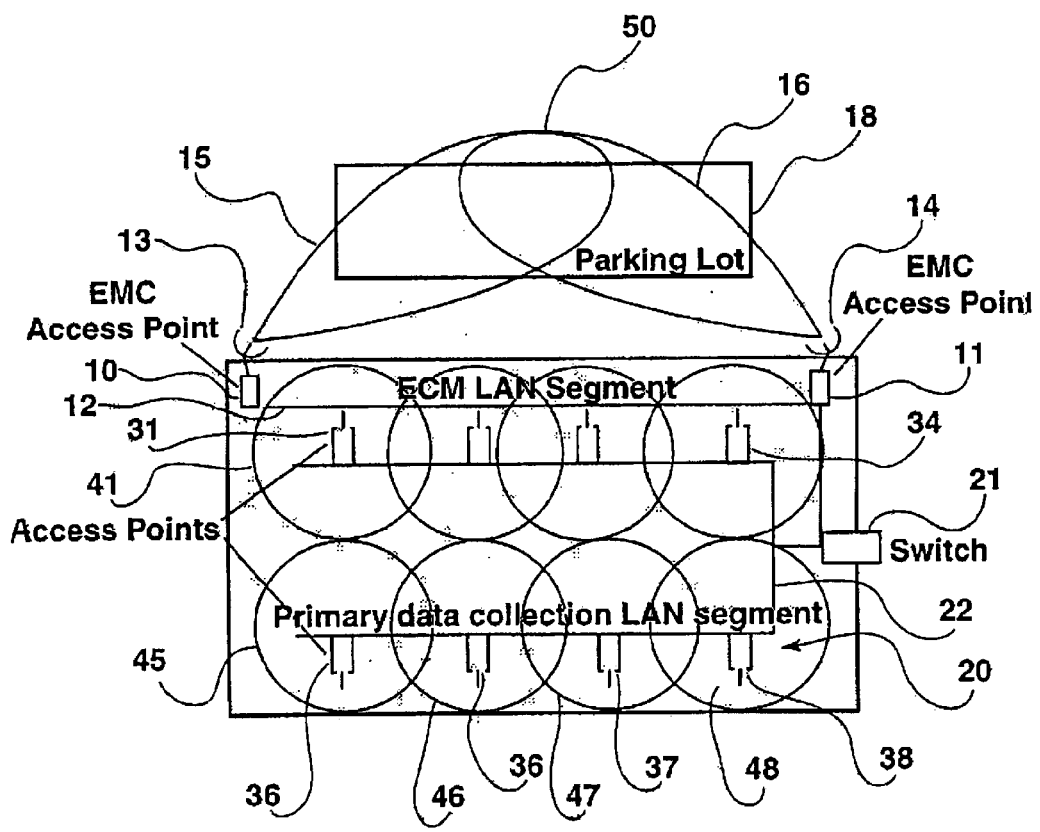

ELECTRONIC COUNTERMEASURE (ECM) SYSTEM AND METHOD

REFERENCE TO RELATED APPLICATIONS

This application claims the benefit of U.S. Provisional Application No. 60/354,608 filed Feb. 6, 2002.

SUMMARY OF THE INVENTION

The system of the present invention may utilize an electronic counter measures (ECM). The purpose of an ECM access point is to prevent wireless network attacks. The ECM access point may provide a wireless coverage area outside of the normal coverage area of the installed wireless LAN. Its coverage area may encompass a physical area that is deemed likely to harbor the perpetrators of a wireless network attack. When an attacker tries to attach to the wireless LAN, he will inadvertently attach to the ECM access point, which will then report this as an intruder on the network.

In a preferred embodiment, the system will eliminate the possibility of many types of wireless network attacks, such as MAC address spoof, denial of service via playback, and other attacks that require the intruder to gain network access. Further, it can provide to the customer, notification whenever an attack is detected. This concept differs from previous wireless network security measures in that they have always been protocol based, whereas the ECM concept relies on hardware and software.

BRIEF DESCRIPTION OF THE DRAWINGS

The single FIGURE of drawings illustrates an exemplary installed wireless local area network provided with ECM access points in accordance with the teaching of the present invention.

DETAILED DESCRIPTION

As illustrated in the single FIGURE of drawings, an exemplary ECM security system may consist of one or more ECM access points such as 10–11, on an ECM LAN segment 12. Each access point will drive a directional antenna such as 13–14 that is intended to provide RF coverage as indicated at 15–16 for physical locations such as 18 that are likely to harbor a potential wireless network intruder. The ECM LAN segment 12 will be isolated from the primary data collection wireless network 20 by a network device, typically a bridge or switch such as 21. The primary data collection wireless local area network is illustrated as comprising an array of wireless access points 31–38 with respective coverage areas 41–48. Wireless clients on the primary data collection wireless LAN 20 will not be allowed to attach to ECM access points such as 10–11.

The network device 21 that isolates the ECM LAN segment 12 is configured to pass only Simple Network Management Protocol (SNMP) data frames or similar special signals from the ECM segment. The ECM segment will be populated with network traffic that resembles actual network traffic of the network being protected, but the simulated traffic contains no information that would compromise the privacy of the employer of such a system. Passing or supplying artificial network traffic to the ECM segment, and transmitting such traffic wirelessly via ECM access points will give the illusion that the ECM access points are functioning as normal access points, effectively camouflaging them.

The ECM access points 10–11 are configured to send an SNMP trap or other special signal identifying the ECM access point or similar source of the special signal whenever a wireless station associates with them (e.g. in attempting to access the network being simulated). This trap or other special signal will be allowed to pass through the network device 21 to be received by a software application residing on a network enabled computer, or by a similar processing system residing on the network so as to be coupled with a communication facility of the ECM access points, and/or being communicatively coupled directly with a communication facility of the ECM access points, so that the processing system will then report the special signal as a security threat. The trap or other special signal(s) will be associated with the ECM access point(s) that sent the special signal(s); therefore, it's possible to determine a general physical location of the wireless network intruder based on the coverage area of the ECM access point identified by the special signal, (or based on the overlapping coverage area of plural access points identified by respective special signals for an intruder located in an overlapping coverage area such as 50).

The entire description and drawings of my provisional patent application No. 60/354,608 filed Feb. 6, 2002 are hereby incorporated herein by reference.

It should be understood that the embodiment described hereinabove is merely illustrative, and that modification and adaptation will occur to those skilled in the art from a consideration of the present disclosure, and are intended as being within the scope of the teachings and concepts of the present invention. For example, certain claims are intended to cover the use of simulated network access points that are completely separate from, and disconnected from, the network being protected, but e.g. supply simulated wireless network signals to respective coverage areas such as 15 and 16. If an intruder attempts wireless access to one or more of such isolated simulated network access points, such isolated access points may have communication facilities for sending special signals e.g. wirelessly, but independent of the network, to a monitoring station e.g. separate and distinct from the network. A remote monitoring station is not required to be on the network, the processing system of each ECM access point may itself be capable of assembling a message giving the intruder location, e.g. after conferring with other overlapping coverage ECM access points, and e.g. a respective master ECM access point acting for itself and the related ECM access points, may send a report or special signal advising of the intrusion, to an independent security agency, not related to the employer of the network being protected, and advising the agency as to the location of the intruder.

I claim:

1. In a system for protecting a network,
   an access point comprising
   a communication facility for sending a special signal from the access point to a remote monitoring station, and
   a processing system for generating a special signal for transmission to the remote monitoring station via the communication facility upon receipt of signals from a general physical region that may harbor a wireless network intruder,
   the access point by detecting signals as being from the general physical region that may harbor a wireless network intruder, itself serving as a sensor for detecting the presence of a wireless network intruder.

2. In a system according to claim 1, a source supplying simulated network traffic to the access point.

3. In a system according to claim 1, the communication facility transmitting the special signals from the access point to a remote monitoring station via the network being protected by the access point.

4. In a system for protecting a network, an access point comprising a communication facility for sending a special signal from the access point to a remote monitoring station, and a processing system for generating a special signal for transmission to the remote monitoring station via the communication facility upon receipt of signals from a general physical region that may harbor a wireless network intruder, the access point having an antenna system for selective pickup of signals from the general physical region such that the special signal conveys information as to the general physical location of a wireless network intruder.

5. In a system for protecting a network, a communication facility for sending a special signal to a remote monitoring station to signify a possible attempted intrusive contact with the network, and a processing system for generating a special signal for transmission to the remote monitoring station via the communication facility upon receipt of wireless signals by the communication facility intended to establish communication with the network, but coming from a general physical region that may harbor a wireless network intruder, the communication facility by detecting wireless signals as being from the general physical region that may harbor a wireless network intruder itself serving as a sensor for detecting the presence of a wireless network intruder.

6. In a system according to claim 5, the communication facility having an antenna system for selective pickup of wireless signals from the general physical region such that the special signal conveys information as to the general physical location of a wireless network intruder.

7. In a system according to claim 5, a source supplying simulated network traffic to the communication facility so that the communication facility in wirelessly transmitting such simulated network traffic, causes the communication facility to appear to an intruder to be an access point of the network.

8. In a system according to claim 5, the communication facility transmitting the special signals from the access point to a remote monitoring station via the network being protected.

* * * * *